June 25, 1946. J. S. HULL 2,402,631
METHOD FOR FORMING HEAT-SEALED ARTICLES
Filed Dec. 20, 1943
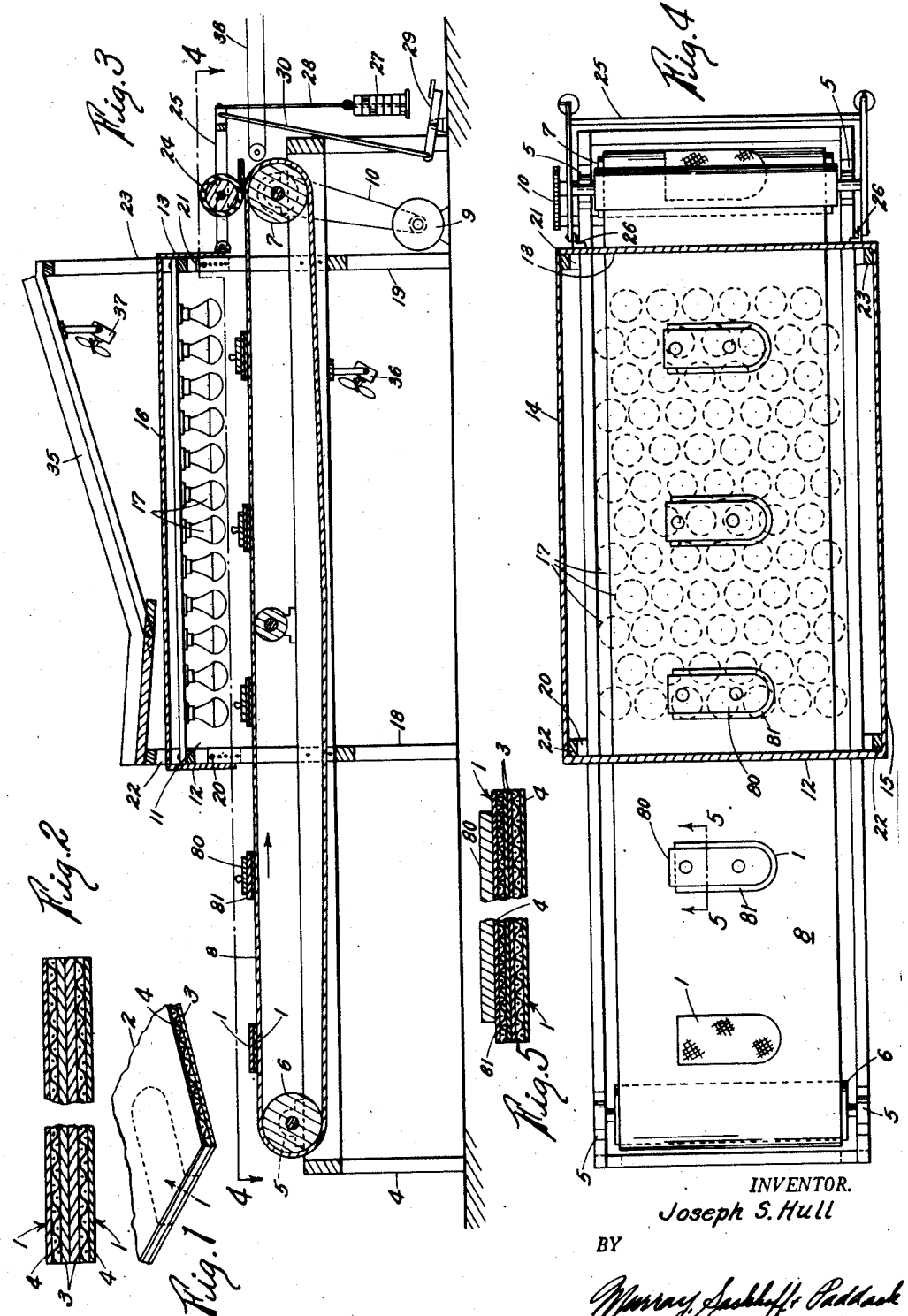
INVENTOR.
Joseph S. Hull
BY
Murray, Sachhoff & Paddack
ATT'YS Patented June 25, 1946

2,402,631

UNITED STATES PATENT OFFICE 2,402,631

METHOD FOR FORMING HEAT-SEALED ARTICLES

Joseph S. Hull, Greenfield, Ohio, assignor to The American Pad & Textile Company, Greenfield, Ohio, a corporation of Ohio Application December 20, 1943, Serial No. 514,891

4 Claims. (Cl. 154—126)

The present invention relates to a method of forming a water and/or air impervious bond between fabric sheets, and is particularly directed to a method of heat sealing the edges of fabric blanks which have been previously coated on both sides with a thermoplastic material.

Heretofore it has been common practice to coat both sides of various types of fabric with thermoplastic film-forming materials to adapt said fabrics to certain uses, such as the forming of waterproof and air-tight closures for life preservers or the like. These coated fabrics were usually made in commercial lengths and shipped in the bolt to the special processor who cut them to the particular pattern required.

In the art of making life-preservers the fabrics mentioned above are coated on both sides, so that upon fabrication, they may serve as air-tight and water-tight envelopes for the enclosed buoyant material held therein. There envelopes were formed by cutting two similar blanks from the coated fabric bolt and binding them together by means of a flat marginal seam. It has been the practice, heretofore, to make the adjacent marginal coatings of the two sheets plastic, through induction, by applying heated bars to both sides of said margin, and simultaneously applying pressure to said bars to press the marginal portions together. This process was unsatisfactory because, when said heated bars were pressed against the exposed coated portions of the fabric material, the coating thereon quite frequently adhered to the contacting surface of the said bars, which created a checked and undesirable seam. Also these adhering particles on the bars subsequently prevented them from exerting an equal pressure upon the fabric material therebetween and, as a consequence, the thermo-plastic seal made by these bars permitted air and water to enter the envelope. Applicant has overcome these disadvantages in his process, wherein the heating step is obtained by a radiant, non-contacting heating means, and said heating step precedes and is separate and distinct from the pressing step. Furthermore applicant's method provides for an intermediate cooling period between his heating and pressing steps which serves to harden only the exposed, heated face of the blank before it is pressed.

It is, therefore, an object of this invention to provide a process for heat sealing fabric sheets having a thermo-plastic coating on their adjacent faces which is susceptible of large scale production, and which is economical and efficient in operation.

Another object of the invention is to provide a method of producing a water and air impervious bonded seam between two fabric blanks which have each been pre-coated on both sides with a thermo-plastic material, the exposed faces of the finished seam being free of check marks, or the like.

Another object of the invention is to provide a method of producing an air- and water-tight, heat-sealed seam which is free of check marks on its exposed faces.

Other objects will be apparent from the following specification and drawing in which:

Fig. 1 is a fragmental, perspective view of the coated sheet material from which the envelope blanks are cut.

Fig. 2 is an enlarged, fragmental, cross-sectional view of two superimposed, coated fabric blanks.

Fig. 3 is a longitudinal cross-sectional view of a preferred machine for carrying out the process of this invention.

Fig. 4 is a cross-sectional view taken on line 4—4 of Fig. 3.

Fig. 5 is an enlarged, fragmental, cross-sectional view taken on line 5—5 of Fig. 4.

Preliminary to carrying out the steps of my invention, blanks 1 are cut from a bolt of fabric 2 which has been previously coated on both sides with a thermo-plastic film-forming material (Fig. 1). The coating 3, which is to constitute the adjacent face of each blank when a blank is superimposed on a similar blank (Fig. 2), is based on polyvinyl chloride or polyvinyl acetate-polyvinyl chloride copolymers plasticized with a solvent such as dioctyl phthalate. The amount of solvent used determines the thermo-plasticity of the film material. The exposed face 4 of the blank is provided with a thermo-plastic coating having less thermoplasticity than the coating 3, and to this end a polyvinyl chloride may be applied thereto. Other materials such as plasticized ethyl cellulose, cellulose acetate, cellulose aceto butyrate, vinylidene chlorine, etc., may be used as a film-forming material in this process. As indicated in Fig. 2, the fabric blank coated on both sides is superimposed on a similar blank so that the thermo-plastic coating 3 on the interior faces of each blank are in contact with each other.

The process of this invention may be clearly understood by a description of it in conjunction with a preferred machine for carrying out the steps of said process. The machine has a longitudinal frame which carries at its opposite ends a pair of journal bearings 5 for mounting end rollers 6 and 7, an endless belt 8 passes around these rollers and is moved in the direction of the arrow (Fig. 3) by a motor 9, having a driving connection with the roller 7 through a chain and sprocket generally indicated by the reference numeral 10. The two superimposed blanks, positioned as indicated in Fig. 2, are placed upon the conveyor belt 8 at an assembly station which is located at the left-hand end of the machine as illustrated in Figs. 3 and 4.

A mask 80, made of an heat insulating material, is positioned upon the uppermost sheet at this assembly station, and is of a form to permit the exposure of the marginal edge 81 of the uppermost blank. This invention has been illustrated as having a narrow belt for conveying one line of superimposed blanks through the machine. It will be understood that by widening the belt, blanks may be assembled from both sides thereof, thus increasing the lines of blanks carried through said machine.

The heating step of the process is carried out in a closed chamber 11, provided with end walls 12 and 13, side walls 14 and 15 and a top wall 16. The side walls extend below the upper reach of the endless belt, while the end walls are spaced away from said belt to provide clearance for the entrance of the masked coated blanks positioned upon the belt. Suitably supported within the chamber is a battery of infra-red lights 17 which, as shown in Fig. 4, are positioned in staggered transverse rows. The vertical height of this battery of radiant heat lights is adjustable in any suitable manner, and, as shown in the drawing, the vertical uprights 18 and 19 which support the chamber walls may terminate at 20 and 21 and be provided at their upper portion with holes for selectively receiving a bolt fastened in the uprights 22 and 23. The superimposed blanks with the mask positioned thereon are carried by the belt under the rows of infra-red lights, and the radiant heat therefrom penetrates through the marginal edge of the exposed blank to soften the thermo-plastic, adjacent coatings 3 between said blanks, and directly beneath said marginal edge.

Upon leaving the chamber, the exposed marginal face of the uppermost blank is subjected to a short cooling step as it is carried between the chamber exit and a pressing roller 24. The time of this cooling step is relatively short and is adapted to permit the marginal, exposed coating to become less plastic, but is not sufficient to cause any hardening of the intermediate, adjacent coatings 3. The mask is removed from the blanks at this cooling station, and is returned to the assembly station by a suitable chute 35.

The pressing operation is made by passing the superimposed blanks between the rubber roller 24 and the conveyor belt, while the intermediate marginal thermoplastic coatings 3 are still soft, so that said material is forced into the interstices of the blanks to form a bonded seam therefor.

The rubber roller 24 may be pivotally mounted over roller 7 and in contact with the belt 8 by means of a yoke 25 fastened at its inner ends by bracket and pin arrangements 26. Downward pressure is applied to the roller 24 by means of adjustable weights 27, which are attached to the end of the yoke by cables 28. The roller 24 may be moved away from the belt by foot pedal 29 through a link connection 30. A suitable fan 36 may be directed on the return reach of the endless belt to cool its exposed surface while a fan 37 is directed upon the return chute 35 to cool the masks.

It will be noted that in the particular process described one edge of the superimposed blanks is insulated from the action of the radiant lamps by the mask 80, thereby precluding the heat-sealing of said marginal edge. After the blanks leave the presser roller 24, they may be received on a suitable conveyor belt 38 (Fig. 3) and moved thereon to an assembly station, where buoyant material is stuffed into the sealed blanks through the open end thereof, and said end subsequently sealed by any other suitable sealing means.

While my process has been described in relation to the manufacture of a waterproof and air-tight envelope for life-preservers which require the use of fabrics coated on both sides with a thermo-plastic material, it will be manifest to those skilled in the art that sheets having only a single side treated with a thermo-plastic coating could be processed by my method and that many other articles requiring heat-sealed bonds could be made by said process without departing from the spirit and scope of the invention as indicated in the appended claims.

What is claimed is:

1. The herein described method of creating a marginal bond between two fabric blanks pre-coated on adjacent sides with a thermo-plastic material which consists in superimposing the fabric blanks one upon the other, insulating the body portion of one exposed face of the blanks, directing radiant heat rays on said exposed face, removing the insulation from the face, cooling the exposed face, and pressing the blanks together while the coating is in a plastic condition.

2. The herein described method of creating a bonded portion between two fabric blanks each pre-coated on both sides with a thermo-plastic material which consists in superimposing the fabric blanks one upon the other, insulating the exposed face of one blank adjacent the unbonded portion between said blanks, directing radiant heat rays on the exposed face adjacent the bonded portion, removing the insulation from the face, cooling said exposed face, and pressing the blanks together while the adjacent coatings are in a plastic condition.

3. The herein described method of creating a bonded portion between two fabric blanks each pre-coated on both sides with a thermo-plastic material which consists in superimposing the fabric blanks one upon the other, insulating the exposed face of one blank adjacent the unbonded portion between said blanks, moving the insulated blanks through radiant heat rays, removing the insulation from the blanks, cooling the exposed face adjacent the bonded portion, and pressing the blanks together while the adjacent coatings are in a plastic condition.

4. The herein described method of creating a bonded portion between two fabric blanks each pre-coated on both sides with a thermo-plastic material which consists in superimposing the fabric blanks one upon the other, insulating a substantial portion of the uppermost side of the top blank, moving the insulated blanks beneath a radiant heat source, removing the insulation from the blanks, cooling the uppermost face, and pressing the blanks together while portions of the adjacent coatings are in a plastic condition.

JOSEPH S. HULL.